(12) United States Patent
Ryu et al.

(10) Patent No.: US 9,231,485 B2
(45) Date of Patent: Jan. 5, 2016

(54) POWER SUPPLY

(71) Applicant: SAMSUNG ELECTRO-MECHANICS CO., LTD., Suwon-Si (KR)

(72) Inventors: Byoung Woo Ryu, Suwon-Si (KR); Tae Seok Ko, Suwon-Si (KR)

(73) Assignee: Samsung Electro-Mechanics Co., Ltd, Gyeonggi-Do (KR)

( * ) Notice: Subject to any disclaimer, the term of this patent is extended or adjusted under 35 U.S.C. 154(b) by 0 days.

(21) Appl. No.: 14/582,200

(22) Filed: Dec. 24, 2014

(65) Prior Publication Data

US 2015/0207421 A1 Jul. 23, 2015

(30) Foreign Application Priority Data

Jan. 22, 2014 (KR) .................. 10-2014-0007758

(51) Int. Cl.
| | |
|---|---|
| *H05B 33/08* | (2006.01) |
| *H02M 3/335* | (2006.01) |
| *H02M 1/12* | (2006.01) |
| *H02M 7/06* | (2006.01) |
| *H02M 7/217* | (2006.01) |
| *H02M 1/00* | (2007.01) |

(52) U.S. Cl.
CPC .......... *H02M 3/33515* (2013.01); *H02M 1/126* (2013.01); *H02M 3/33523* (2013.01); *H02M 7/068* (2013.01); *H02M 7/217* (2013.01); *H05B 33/08* (2013.01); *H02M 2001/0035* (2013.01)

(58) Field of Classification Search
CPC .... H05B 37/02; H05B 33/08; H05B 33/0851; H05B 33/0815; H05B 33/0887

USPC ............ 315/200 R, 201, 206, 279, 291, 297, 315/307, 308
See application file for complete search history.

(56) References Cited

U.S. PATENT DOCUMENTS

| | | | | |
|---|---|---|---|---|
| 8,901,843 | B2 * | 12/2014 | Jin .................... | H02M 33/0815 315/205 |
| 2011/0169426 | A1 | 7/2011 | Sadwick et al. | |
| 2011/0194311 | A1 | 8/2011 | Gaknoki et al. | |
| 2012/0248998 | A1 * | 10/2012 | Yoshinaga ........ | H02M 33/0815 315/193 |
| 2012/0268039 | A1 | 10/2012 | Chen | |
| 2013/0063039 | A1 * | 3/2013 | Hwang ............. | H02M 3/33523 315/223 |

FOREIGN PATENT DOCUMENTS

| | | |
|---|---|---|
| EP | 1 742 337 | 1/2007 |
| EP | 1 814 213 | 8/2007 |
| KR | 10-2012-0014511 | 2/2012 |

OTHER PUBLICATIONS

Extended European Search Report dated Jun. 24, 2015 for EP Patent Application No. 14275255.9.

* cited by examiner

*Primary Examiner* — Thai Pham
(74) *Attorney, Agent, or Firm* — Ladas & Parry, LLP (57) ABSTRACT

A power supply may include a driving power supply unit converting input power to supply driving power to a load, and a power supply control unit performing a control to detect a change in a voltage level of the driving power and cut off the input power when the detected voltage level of the driving power is equal to or more than a preset voltage level, in a preset standby mode.

17 Claims, 4 Drawing Sheets

POWER SUPPLY

CROSS REFERENCE(S) TO RELATED APPLICATIONS

This application claims the benefit under 35 U.S.C. Section 119 of Korean Patent Application Serial No. 10-2014-0007758, entitled "Power Supply" filed on Jan. 22, 2014, which is hereby incorporated by reference in its entirety into this application.

BACKGROUND

1. Technical Field

Some embodiments of the present disclosure relate to a power supply.

2. Description of the Related Art

Generally, electronic products meeting various needs of a user have been implemented variously and may adopt a power supply which supplies operating power to implement the corresponding functions. The power supply may generally adopt a switching mode power supply scheme which has advantages, such as power conversion efficiency and miniaturization.

Meanwhile, these electronic products adopt a standby mode which consumes minimum power while awaiting an operation selection from a user. To support the standby mode, the power supply may consume minimum power while awaiting the operation selection from the user.

Recently, as power consumption is increased, there is a tendency to reduce power consumption during the standby mode, that is, reduce the standby power. Therefore, the power consumption may be regulated depending on a load condition.

For example, in the case of an LED lighting power driver, a current standby power regulation may be requested to consume power less than 300 mW in the standby mode which is, for example, a no-load state or a light load state and to satisfy the standby power regulation, a burst mode which may repeatedly perform an operation of performing a switching operation for a predetermined time and/or an operation of stopping a switching operation for a predetermined time through feedback at the time of the standby mode may be used.

The burst mode type may somewhat satisfy a current standby power regulation, but a section in which the switching operation stops, that is, a skip section may be short, and therefore when the standby power regulation is more strengthened with the increase in power consumption in the future, for example, when the standby power regulation is strengthened from less than 300 mW at present to about 10 mW or less, the power supply of the current burst mode type may not satisfy the strengthened standby power regulation.

Therefore, a type of making the skip section longer by improving the burst mode type as described above, and the like may be considered. This type may be a type of stopping only the switching operation and may have a difficulty in steadily satisfying the standby power regulation which is expected to be continuously strengthened in the future.

Therefore, the development of a new type of power supply which may steadily satisfy the standby power regulation expected to be continuously strengthened may be needed.

RELATED ART DOCUMENT

Patent Document (Patent Document 1) Korean Patent Laid-Open Publication No. 2012-0014511

SUMMARY

In some embodiments, a power supply may be capable of more reducing standby power and implementing reduction in the number of parts, circuit miniaturization, cost saving, and the like by cutting off input power depending on a voltage level of driving power.

According to some exemplary embodiments of the present disclosure, a power supply may include a driving power supply unit converting input power to supply driving power to a load; and a power supply control unit performing a control to detect a change in a voltage level of the driving power and cut off the input power when the detected voltage level of the driving power is equal to or more than a first preset voltage level, in a preset standby mode.

The power supply control unit may perform a control to supply the input power when the detected voltage level of the driving power is equal to or less than a second preset voltage level, in the standby mode. The second preset voltage level may be the same as or different from the first preset voltage level.

The power supply control unit may include: a driving power detection unit detecting the change in the voltage level of the driving power; and an input power control unit performing a control to cut off or supply the input power based on the voltage level of the driving power detected by the driving power detection unit.

A primary side stage may be connected to the input power and a secondary side stage may be connected to the driving power. One or both of the driving power detection unit and the input power control unit may be formed in the primary side stage.

The driving power detection unit may detect the change in the voltage level of the driving power using an auxiliary coil formed in the primary side stage.

The input power control unit may include: a comparator comparing the detected voltage level of the driving power with a preset reference voltage level and outputting a voltage signal having a signal level depending on the comparison result; an inverter inverting a level of the voltage signal output from the comparator; a timing signal generator connected to the inverter and generating and outputting a timing signal based on the detected voltage level of the driving power; and a switching unit turned on/off depending on the timing signal output from the timing signal generator to cut off or supply the input power.

The timing signal generator may output a signal of a level which turns off the switching unit when the detected voltage level of the driving power is equal to or more than the preset reference voltage level.

The timing signal generator may output a signal of a level which turns on the switching unit when the detected voltage level of the driving power is equal to or less than the preset reference voltage level, in the standby mode.

A primary side stage may be connected to the input power and a secondary side stage may be connected to the driving power. The driving power detection unit may be formed in the secondary side stage and the input power control unit may be formed in the primary side stage.

The driving power detection unit may detect the change in the voltage level of the driving power using a division resistor formed in the secondary side stage.

The input power control unit may include: a comparator comparing the detected voltage level of the driving power with a preset reference voltage level and outputting a voltage signal having a signal level depending on the comparison result; an inverter inverting a level of the voltage signal output from the comparator; a timing signal generator connected to the inverter and generating and outputting a timing signal based on the detected voltage level of the driving power; and a switching unit turned on/off depending on the timing signal output from the timing signal generator to cut off or supply the input power.

The timing signal generator may turn off the switching unit when the detected voltage level of the driving power is equal to or more than the preset reference voltage level.

The timing signal generator may output a signal of a level which turns on the switching unit when the detected voltage level of the driving power is equal to or less than the preset reference voltage level, in the standby mode.

The driving power supply unit may include: a filter unit filtering electro-magnetic interference of the input power; a rectifying unit rectifying the filtered input power; a power switching unit switching the rectified input power; a transforming unit transforming the switched input power depending on a preset turn ratio; a driving power output unit rectifying the transformed power to output the driving power to the load; and a switching controller controlling a switching operation of the power switching unit depending on a feedback signal corresponding to an output of the driving power.

The power supply control unit may be connected to the rectifying unit and may perform a control to cut off the rectified input power when the detected voltage level of the driving power is equal to or more than the first preset voltage level.

The power supply control unit may perform a control to supply the rectified input power when the detected voltage level of the driving power is equal to or less than a second preset voltage level, in the standby mode. The second preset voltage level may be the same as or different from the first preset voltage level.

The load may comprise at least one light emitting diode.

DESCRIPTION OF THE PREFERRED EMBODIMENTS

The acting effects and technical configuration with respect to the objects of a power supply according to the present disclosure will be clearly understood by the following description in which exemplary embodiments of the present disclosure are described with reference to the accompanying drawings.

Further, when it is determined that the detailed description of the known art related to the present disclosure may obscure the gist of the present invention, the detailed description thereof will be omitted. In the description, the terms "first", "second", and so on are used to distinguish one element from another element, and the elements are not defined by the above terms.

First Exemplary Embodiment

Figure 1:
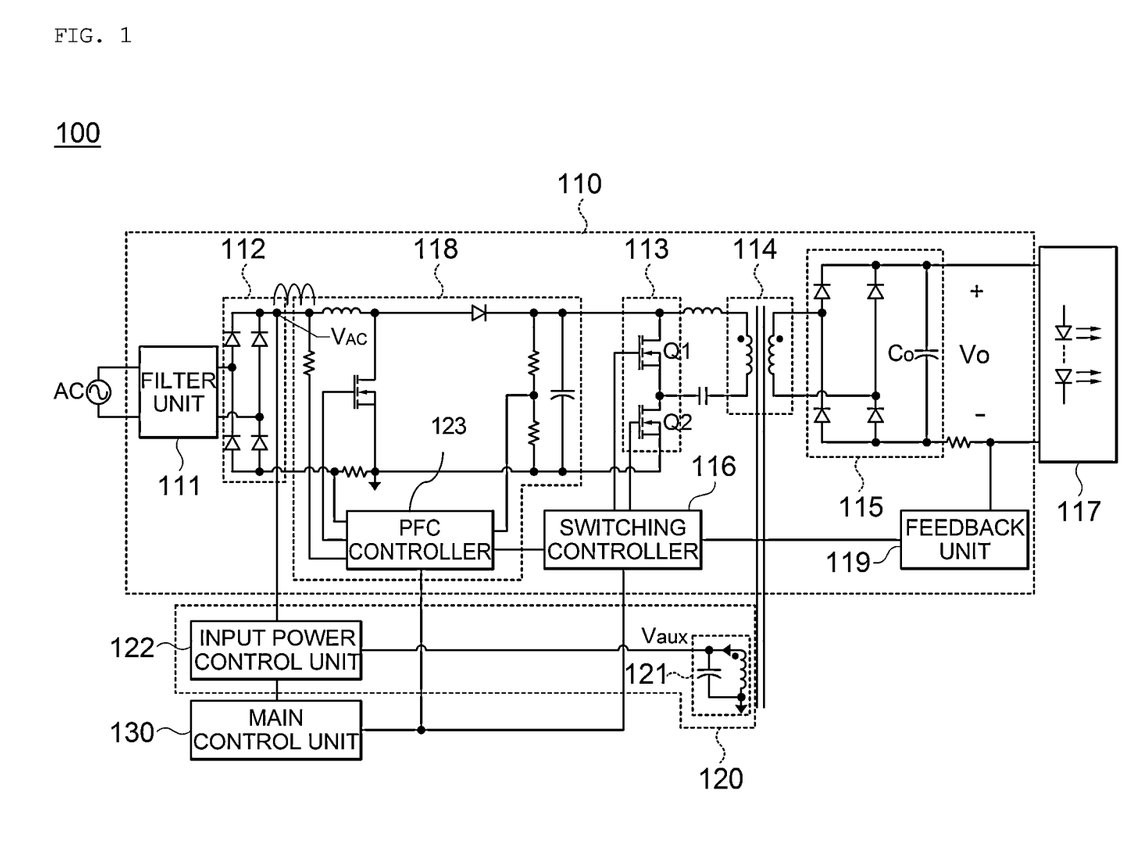
FIG. 1 is a schematic circuit diagram of a power supply according to a first exemplary embodiment of the present disclosure.

FIG. 1 illustrates a schematic circuit diagram of a power supply 100 according to a first exemplary embodiment of the present disclosure.

As illustrated in FIG. 1, the power supply 100 according to the first exemplary embodiment of the present disclosure may include a primary side stage which is connected to input power and a secondary side stage which is connected to driving power $V_O$. The power supply 100 may include a driving power supply unit 110 and a power supply control unit 120.

The driving power supply unit 110 according to the first exemplary embodiment of the present disclosure may convert the input power to supply the driving power $V_O$ to a load 117. As illustrated in FIG. 1, the driving power supply unit 110 may include a filter unit 111, a rectifying unit 112, a power switching unit 113, a transforming unit 114, a driving power output unit 115, and a switching controller 116.

The filter unit 111 may filter electro-magnetic interference included in the input power. The input power may be alternating current (AC) power.

The rectifying unit 112 may rectify the filtered input power. For example, according to the first exemplary embodiment of the present disclosure, as illustrated in FIG. 1, the rectifying unit 112 may comprise a bridge diode, but not limited thereto.

Further, according to the first exemplary embodiment of the present disclosure, the power supply 100 may comprise a power factor correction (PFC) unit 118. The PFC unit 118 may be connected to the rectifying unit 112 as illustrated in FIG. 1.

The PFC unit 118 may be included to improve power efficiency by adding a power saving circuit to the power supply 100. The PFC unit 118 may control power input to components such as a transformer and a stabilizer which may have a risk of instant power leakage. However, the PFC unit 118 may be an optional component for improving power efficiency and therefore is not necessarily required.

The power switching unit 113 may switch the rectified input power $V_{AC}$ and may include at least one of switching elements Q1 and Q2.

For example, in the first exemplary embodiment of the present disclosure, as illustrated in FIG. 1, the power switching unit 113 may comprise a metal oxide silicon field effect transistor (MOSFET), but not limited thereto. Any element which may perform an on/off switching operation, for example, a general-purpose transistor, and the like may be used in the power switching unit 113.

As illustrated in FIG. 1, the transforming unit 114 may include a primary side winding and a secondary side winding. For example, the primary side winding of the transforming unit 114 may receive the switched power and the secondary side winding of the transforming unit 114 having a preset turn ratio to the primary side winding may transform and output a voltage level of the power input to the primary side winding.

In this case, the transforming unit 114 may include, for example, but not limited to, a flyback converter, a forward converter, and the like. However, any device which may change the switched power to the voltage level of the direct current power depending on the preset turn ratio may be used.

The driving power output unit 115 may rectify the power output from the secondary side winding of the transforming unit 114 to output the driving power $V_O$ having the preset voltage level to the load 117. In this case, the driving power output unit 115 according to the first exemplary embodiment of the present disclosure may further include a smoothing capacitor $C_0$ which may smooth the rectified power.

The power supply 100 may further comprise, according to the first exemplary embodiment of the present disclosure, the load 117, for example, but not limited to, at least one light emitting diode (LED) which performs a constant current control. However, any device which may be driven with the power output from the power supply 100 described above may be used.

The switching controller 116 may be fed back with a signal corresponding to the output of the driving power $V_O$ from the secondary side of the feedback unit 119 and may control a switching duty, and the like in response to the feedback signal described above to control the switching operation of the power switching unit 113.

Meanwhile, as illustrated in FIG. 1, the power supply control unit 120 according to the first exemplary embodiment of the present disclosure may be connected to the rectifying unit 112. The power supply control unit 120 may include a driving power detection unit 121 and an input power control unit 122.

The power supply control unit 120 according to the first exemplary embodiment of the present disclosure comprising the driving power detection unit 121 and the input power control unit 122 may be formed in the primary side stage.

As illustrated in FIG. 1, the driving power detection unit 121 may be formed in the primary side stage, for example, in a form of an auxiliary coil, and the driving power $V_O$ of the secondary side may be reflected through the auxiliary coil. Therefore, the driving power detection unit 121 may detect the change in the voltage level $V_O$ of the driving power.

Therefore, in the first exemplary embodiment of the present disclosure, one or more parts (for example, a photo coupler, and the like) for transferring a signal (for example, transferring a voltage waveform signal, and the like of the driving power) from the secondary side stage to the primary side stage through the power supply control unit 120 formed in the primary side stage may not be needed. Therefore, the power supply 100 according to the first exemplary embodiment of the present disclosure may reduce the number of parts, the size of a circuit, a cost, and the like.

The input power control unit 122 may control an operation of cutting off or supplying the input power, for example, the input power $V_{AC}$ rectified by the rectifying unit 112 based on a voltage level $V_{aux}$ of the driving power which is detected by the driving power detection unit 121.

For example, by the above configuration of the driving power detection unit 121 and the input power control unit 122, the power supply control unit 120 according to the first exemplary embodiment of the present disclosure may detect the change in the voltage level of the driving power, and, when the voltage level $V_{aux}$ of the detected driving power is equal to or more than a preset voltage level in the preset standby mode (for example, a no-load state or a light load state), may cut off the input power $V_{AC}$. Further, when the voltage level $V_{aux}$ of the driving power detected in the standby mode is equal to or less than the preset voltage level, the power supply control unit 120 may control to supply the input power $V_{AC}$. The detailed configuration and operation thereof will be described below.

Figure 2:
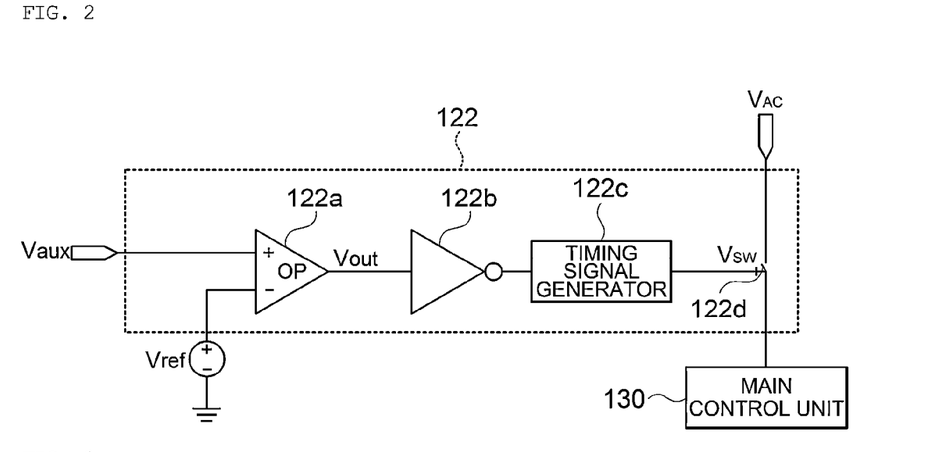
FIG. 2 is a detailed configuration diagram of an input power control unit according to the first exemplary embodiment of the present disclosure.

FIG. 2 illustrates a detailed configuration diagram of the input power control unit 122 according to the first exemplary embodiment of the present disclosure.

As illustrated in FIG. 2, the input power control unit 122 according to the first exemplary embodiment of the present disclosure may include a comparator 122a, an inverter 122b, a timing signal generator 122c, and a switching unit 122d.

As illustrated in FIGS. 1 and 2, the comparator 122a may compare the voltage level $V_{aux}$ of the driving power detected by the driving power detection unit 121 with a preset reference voltage level $V_{ref}$.

For example, the comparator 122a may include a first input terminal, a second input terminal, and an operational amplifier (OP). For example, as illustrated in FIG. 2, the first input terminal may be a non-inversion input terminal and the second input terminal may be an inversion input terminal.

The first input terminal of the comparator 122a may receive the voltage level $V_{aux}$ of the driving power detected by the driving power detection unit 121 and the second input terminal of the comparator 122a may receive the preset reference voltage level $V_{ref}$.

Further, the operational amplifier (OP) of the comparator 122a may compare the voltage level $V_{aux}$ of the driving power detected by the driving power detection unit 121 with the preset reference voltage level Vref and output a voltage signal Vout having a signal level depending on the comparison result to the inverter 122b.

As illustrated in FIG. 2, the inverter 122b may invert the level of the voltage signal output from the comparator 122a (for example, the level of $V_{out}$ illustrated in FIG. 3) and may output the inverted signal to the timing signal generator 122c.

As illustrated in FIG. 2, the timing signal generator 122c may be connected to the inverter 122b, generate a timing signal Vsw based on the detected voltage level $V_{aux}$ of the driving power, and output the generated timing signal Vsw to the switching unit 122d to control on/off operations of the switching unit 122d.

As illustrated in FIG. 2, the switching unit 122d may be turned on/off depending on the timing signal Vsw output from the timing signal generator 122C to supply or cut off the input power $V_{AC}$ to or from the main control unit 130. Here, as illustrated in FIG. 1, the main control unit 130 may control other controllers (for example, a PFC controller 123, a switching controller 116, and the like in the first exemplary embodiment of the present disclosure) which control each component of the primary side stage.

Therefore, the power supply 100 according to the first exemplary embodiment of the present disclosure may control on/off operations of the switching unit 122d to control to supply or cut off the input power $V_{AC}$ to or from the main control unit 130, and thus may control the operation or the stopping of each component of the power supply 100.

The switching unit 122d according to the first exemplary embodiment of the present disclosure may be any switching element which may perform on/off switching operations, for example, but not limited to, a switching element such as MOSFET, a general-purpose transistor, and the like.

Figure 3:
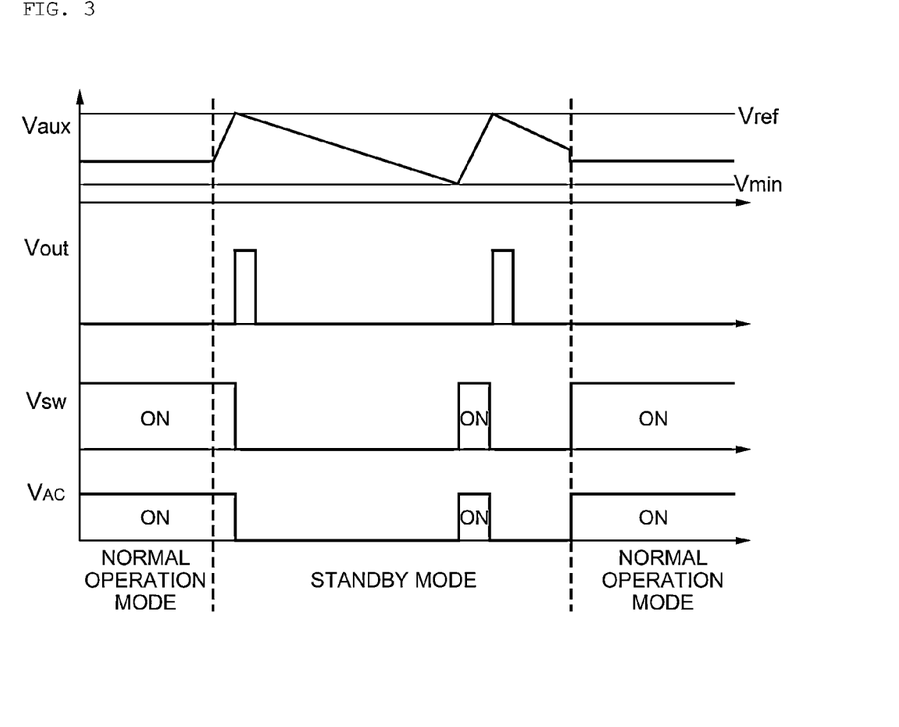
FIG. 3 is signal waveform diagrams of some parts of the power supply according to the first exemplary embodiment of the present disclosure.

FIG. 3 illustrates signal waveform diagrams of some parts of the power supply 100 according to the first exemplary embodiment of the present disclosure. As illustrated in FIG. 3, the power supply 100 according to the first exemplary embodiment of the present disclosure may repeatedly perform operations of a normal operation mode and the standby mode.

Hereinafter, in the power supply 100 according to the first exemplary embodiment of the present disclosure configured as described above, some exemplary operation processes depending on the normal operation mode and the standby mode will be described in detail with reference to FIGS. 1 to 3.

<Normal Operation Mode>

In the case in which a current having a predetermined magnitude or more flows in the load 117 supplied with the driving power $V_O$, that is, in the case of the normal operation mode, the voltage level $V_{aux}$ detected by the driving power detection unit 121 may be constantly smaller than the preset reference voltage level $V_{ref}$. Therefore, the timing signal generator 122c may generate the timing signal $V_{sw}$ of the level (high level in FIG. 3) which turns on the switching unit 122d and may output the generated timing signal $V_{sw}$ to the switching unit 122d.

In this case, the switching unit 122d of the input power control unit 122 may be in a turn on state and thus may supply the rectified input power $V_{AC}$ to the main control unit 130.

Therefore, the power supply 100 according to the first exemplary embodiment of the present disclosure may normally perform operations of each component of the power supply 100 depending on the entire control of the main control unit 130 in the case of the normal operation mode.

<Standby Mode>

When the current of the load 117 supplied with the driving power $V_0$ is 0 or approximates 0, that is, when the power supply is in the standby mode which may be a no-load state or a light load state, according to the first exemplary embodiment of the present disclosure, in the case in which the load 117 is, for example, an LED module, the voltage level $V_O$ of the driving power may be increased due to control of the constant current.

In this case, when the voltage level $V_O$ of the driving power is increased, as illustrated in FIG. 3, the voltage level $V_{aux}$ in the power detection unit 121 (auxiliary coil in the first embodiment) may be increased in proportion thereto, and when the voltage level $V_{aux}$ detected by the driving power detection unit 121 is equal to or more than the preset reference voltage level $V_{ref}$ according to the comparison result of the comparator 122a, the timing signal generator 122c may output the timing signal Vsw of the level (low level in FIG. 3), which turns off the switching unit 122d, to the switching unit 122d.

In this case, the switching unit 122d may be turned off depending on the timing signal Vsw as described above to cut off the supply of the input power $V_{AC}$ to the main control unit 130, such that the power supply 100 according to the first exemplary embodiment of the present disclosure may stop all the operations of each component of the power supply 100 including the switching operation of the power switching unit 113.

Next, as illustrated in FIG. 3, when the detected voltage level Vaux of the driving power is equal to or less than a preset voltage level Vmin (for example, a minimum voltage level required to perform the operation of the input power control unit 122, and the like), the timing signal generator 122c may output the timing signal Vsw of the level (high level in FIG. 3), which turns on the switching unit 122d, to the switching unit 122d.

The switching unit 122d may be turned on depending on the timing signal Vsw as described above to supply the input power $V_{AC}$ to the main control unit 130, such that the power supply 100 according to the first exemplary embodiment of the present disclosure may perform operations of each component of the power supply 100 depending on the entire control of the main control unit 130.

The power supply 100 according to the first exemplary embodiment of the present disclosure may cut off the input power $V_{AC}$ itself depending on the voltage level $V_{aux}$ of the driving power by the above-mentioned configuration and operation process.

Therefore, the power supply 100 according to the first exemplary embodiment of the present disclosure may stop the switching operation at the time of the standby mode and all the operations of each component of the power supply 100, and therefore may more reduce the standby power than the power supply (including the power supply of the burst mode type) which stops only the switching operation.

Further, the power supply 100 according to the first exemplary embodiment of the present disclosure may, by the above-mentioned configuration and operation process, cut off the input power $V_{AC}$ itself when the voltage level Vaux of the driving power is equal to or more than the preset voltage level $V_{ref}$.

Therefore, the power supply 100 according to the first exemplary embodiment of the present disclosure may implement an over voltage protection (OVP) function without an additional OVP circuit, thereby, for example, but not limited to, reducing the number of parts, the size of the circuit, cost, and the like.

Second Exemplary Embodiment

Figure 4:
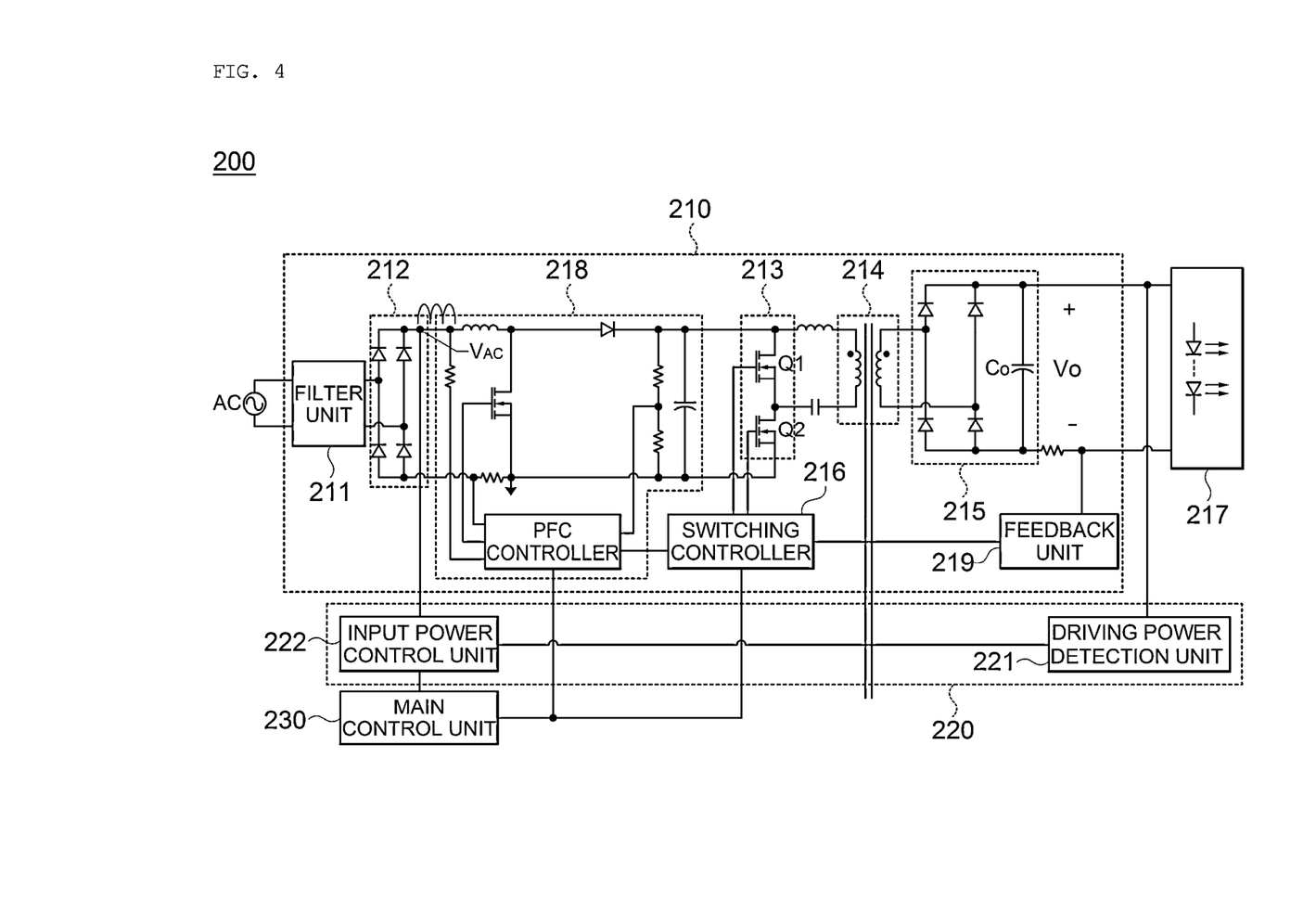
FIG. 4 is a schematic circuit diagram of a power supply according to a second exemplary embodiment of the present disclosure.

FIG. 4 illustrates a schematic circuit diagram of a power supply 200 according to a second exemplary embodiment of the present disclosure.

As illustrated in FIG. 4, the power supply 200 according to the second exemplary embodiment of the present disclosure may include a primary side stage which is connected to input power and a secondary side stage which is connected to driving power $V_O$. The power supply 200 may include a driving power supply unit 210 and a power supply control unit 220 which may be similar to the first exemplary embodiment of the present disclosure.

The driving power supply unit 210 according to the second exemplary embodiment of the present disclosure is the same as, or similar to, the configuration of the first exemplary embodiment and therefore the detailed description thereof will be omitted. Therefore, components (for example, power supply control unit 220, and the like) different from the power supply 100 according to the first exemplary embodiment of the present disclosure and the operation processes thereof will be mainly described.

Similar to the first exemplary embodiment of the present disclosure, the power supply control unit 220 according to the second exemplary embodiment of the present disclosure may be connected to a rectifying unit 212. The power supply control unit 220 may include a driving power detection unit 221 and an input power control unit 222.

In the power supply control unit 220 according to the second exemplary embodiment of the present disclosure, as illustrated in FIG. 4, the driving power detection unit 221 may be formed in the secondary side stage and the input power control unit 222 may be formed in the primary side stage.

That is, unlike the first exemplary embodiment of the present disclosure, in the power supply control unit 220 according to the second exemplary embodiment of the present disclosure, the driving power detection unit 221 may be formed in the secondary side stage.

In this case, the driving power detection unit 221 may directly detect change in the voltage level $V_O$ of the secondary side driving power through a division resistor (not illustrated) formed in the secondary side stage. However, the driving power detection unit 121 according to the first exemplary embodiment of the present disclosure may indirectly detect the voltage level $V_O$ of the secondary side driving power using an auxiliary coil, and the like formed in the primary side.

In this case, compared with the first exemplary embodiment of the present disclosure, according to the second exemplary embodiment of the present disclosure, one or more parts (for example, a photo coupler, and the like) for transferring a voltage waveform signal of the driving power from the secondary side stage to the primary side stage may be additionally included, but the voltage waveform signal may be directly detected in the secondary side, thereby more accurately detecting the voltage level $V_0$ of the driving voltage.

Meanwhile, the input power control unit 222 may control an operation of cutting off or supplying the input power $V_{AC}$, and the like rectified by the rectifying unit 212 based on the voltage level $V_0$ of the driving power which is detected by the driving power detection unit 221.

By the above components, such as the driving power detection unit 221 and/or the input power control unit 222, the power supply control unit 220 according to the second exemplary embodiment of the present disclosure may control to detect change in the voltage level $V_0$ of the driving power, and to cut off the input power $V_{AC}$ when the detected voltage level $V_0$ of the driving power is equal to or more than a preset voltage level in the preset standby mode (for example, the no-load state or the light load state). Further, when the voltage level $V_0$ of the driving power detected in the standby mode is equal to or less than the preset voltage level, the power supply control unit 220 may control to supply the input power $V_{AC}$. The detailed configuration and operation thereof will be described below.

Figure 5:
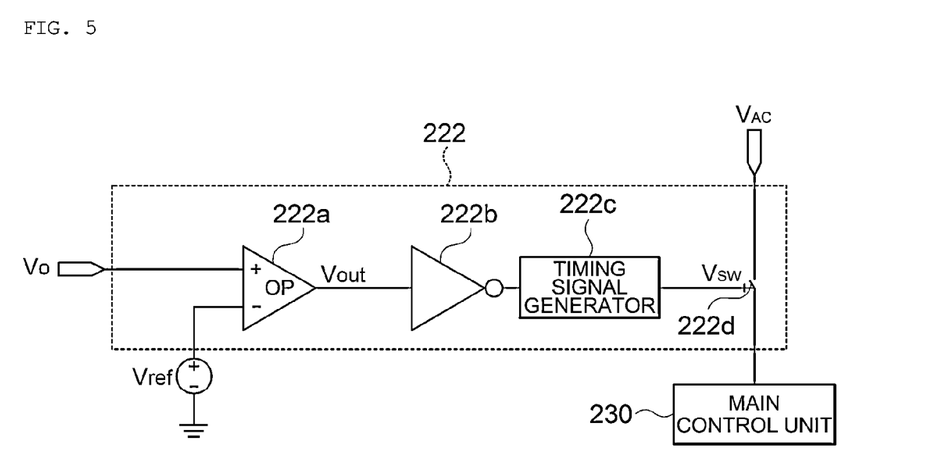
FIG. 5 is a detailed configuration diagram of an input power control unit according to the second exemplary embodiment of the present disclosure.

FIG. 5 illustrates a detailed configuration diagram of the input power control unit 222 according to the first exemplary embodiment of the present disclosure.

As illustrated in FIG. 5, the input power control unit 222 according to the second exemplary embodiment of the present disclosure may include a comparator 222a, an inverter 222b, a timing signal generator 222c, and a switching unit 222d.

As illustrated in FIGS. 4 and 5, the comparator 222a may compare the voltage level $V_O$ of the driving power detected by the driving power detection unit 221 with a preset reference voltage level $V_{ref}$.

In this case, similar to the first exemplary embodiment of the present disclosure, the comparator 222a may include a first input terminal, a second input terminal, and an operational amplifier (OP). For example, as illustrated in FIG. 5, the first input terminal may be a non-inversion input terminal and the second input terminal may be an inversion input terminal.

The first input terminal of the comparator 222a may receive the voltage level $V_0$ of the driving power detected by the driving power detection unit 221 and the second input terminal of the comparator 222a may receive the preset reference voltage level $V_{ref}$.

Further, the operational amplifier (OP) of the comparator 222a may compare the voltage level $V_0$ of the driving power detected by the driving power detection unit 221 with the preset reference voltage level $V_{ref}$ and output a voltage signal $V_{out}$ having a signal level depending on the comparison result to the inverter 222b.

Similar to the first exemplary embodiment of the present disclosure, the inverter 222b may invert the level of the voltage signal output from the comparator 222a (for example, the level of the Vout illustrated in FIG. 6) and may output the inverted signal to the timing signal generator 222c.

Similar to the first exemplary embodiment of the present disclosure, the timing signal generator 222c may be connected to the inverter 222, generate a timing signal Vsw based on the detected voltage level $V_0$ of the driving power detected by the driving power detection unit 221, and output the generated timing signal Vsw to the switching unit 222d to control the on/off operation of the switching unit 222d.

Similar to the first exemplary embodiment of the present disclosure, the switching unit 222d may be turned on/off depending on the timing signal Vsw output from the timing signal generator 222C to supply or cut off the input power $V_{AC}$ to or from the main control unit 230. In this case, the main control unit 230 may be the same as, or similar to, the configuration and/or function of the main control unit 130 according to the first exemplary embodiment of the present disclosure and the description thereof will be omitted.

Therefore, similar to the first exemplary embodiment of the present disclosure, the power supply 200 according to the second exemplary embodiment of the present disclosure may control on/off operations of the switching unit 222d to control to supply or cut off the input power $V_{AC}$ to or from the main control unit 230, and thus may control the operation or the stopping of each component of the power supply 200.

Meanwhile, similar to the first exemplary embodiment of the present disclosure, the switching unit 222d according to the second exemplary embodiment of the present disclosure may be any switching element which may perform on/off switching operations.

Figure 6:
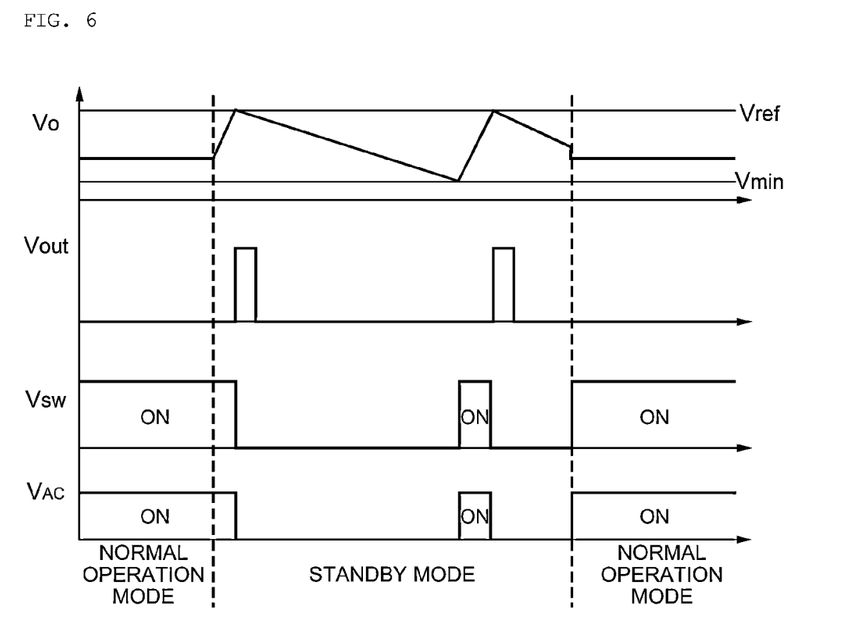
FIG. 6 is signal waveform diagrams of main parts of the power supply according to the second exemplary embodiment of the present disclosure.

FIG. 6 illustrates signal waveform diagrams of some parts of the power supply 200 according to the second exemplary embodiment of the present disclosure. Similar to the first exemplary embodiment of the present disclosure, the power supply 200 according to the second exemplary embodiment of the present disclosure may repeatedly perform operations of a normal operation mode and the standby mode.

Hereinafter, in the power supply 200 according to the second exemplary embodiment of the present disclosure configured as described above, some exemplary operation processes depending on the normal operation mode and the standby mode will be described in detail with reference to FIGS. 4 to 6.

<Normal Operation Mode>

In the case in which a current having a predetermined magnitude or more flows in the load 217 supplied with the driving power $V_O$, that is, in the case of the normal operation mode, the voltage level $V_0$ detected by the driving power detection unit 221 may be constantly smaller than the preset reference voltage level Vref. Therefore, similar to the first exemplary embodiment of the present disclosure, the timing signal generator 222c may generate the timing signal $V_{sw}$ of the level (high level in FIG. 6) which turns on the switching unit 222d and may output the generated timing signal $V_{sw}$ to the switching unit 222d.

In this case, the switching unit 222d of the input power control unit 222 may be in a turn on state and thus may supply the rectified input power $V_{AC}$ to the main control unit 230.

Therefore, similar to the first exemplary embodiment of the present disclosure, the power supply 200 according to the second exemplary embodiment of the present disclosure may normally perform operations of each component of the power supply 200 depending on the entire control of the main control unit 230 in the case of the normal operation mode.

<Standby Mode>

When the current of the load 217 supplied with the driving power $V_0$ is 0 or approximates 0, that is, when the power supply is in the standby mode which may be a no-load state or a light load state, according to the second exemplary embodiment of the present disclosure, in the case in which the load 217 is, for example, an LED module, the voltage level $V_O$ of the driving power detected by the driving voltage detection unit 221 may be increased due to control of the constant current as illustrated in FIG. 6.

Next, when the voltage level $V_O$ detected by the driving power detection unit 221 is equal to or more than the preset reference voltage level $V_{ref}$ according to the comparison result of the comparator 222a, similar to the first exemplary embodiment of the present disclosure, the timing signal generator 222c may output the timing signal Vsw of the level (low level in FIG. 6), which turns off the switching unit 222d, to the switching unit 222d.

In this case, the switching unit 222d may be turned off depending on the timing signal Vsw as described above to cut off the supply of the input power $V_{AC}$ to the main control unit 230, such that the power supply 200 according to the second exemplary embodiment of the present disclosure may stop all the operations of each component of the power supply 200 including the switching operation of the power switching unit 213, similar to the first exemplary embodiment of the present disclosure.

Next, as illustrated in FIG. 6, when the voltage level $V_O$ of the driving power detected by the driving power detection unit 221 is equal to or less than a preset voltage level $V_{min}$ (for example, a minimum voltage level required to perform the operation of the input power control unit 222, and the like), similar to the first exemplary embodiment of the present disclosure, the timing signal generator 222c may output the timing signal $V_{sw}$ of the level (high level in FIG. 6), which turns on the switching unit 222d, to the switching unit 222d.

The switching unit 222d may be turned on depending on the timing signal $V_{sw}$ as described above to supply the input power $V_{AC}$ to the main control unit 230, such that the power supply 200 according to the second exemplary embodiment of the present disclosure may perform the operations of each component of the power supply 200 similar to the first exemplary embodiment of the present disclosure.

The power supply 200 according to the second exemplary embodiment of the present may cut off the input power $V_{AC}$ itself depending on the voltage level $V_O$ of the driving power by the above-mentioned configuration and operation process.

Therefore, similar to the first exemplary embodiment of the present disclosure, the power supply 200 according to the second exemplary embodiment of the present disclosure may stop the switching operation at the time of the standby mode and all the operations of each component of the power supply 200, and therefore may more reduce the standby power than the power supply (including the power supply of the burst mode type) which stops only the switching operation.

Further, the power supply 200 according to the second exemplary embodiment of the present disclosure may, by the above-mentioned configuration and operation process, cut off the input power $V_{AC}$ itself when the voltage level $V_O$ of the driving power is equal to or more than the preset voltage level $V_{ref}$.

Therefore, similar to the first exemplary embodiment of the present disclosure, the power supply 200 according to the second exemplary embodiment of the present disclosure may implement the OVP function without an additional OVP circuit, thereby, for example, but not limited to, reducing the number of parts, the size of the circuit, cost, and the like.

In some embodiments, the power supply 100 or 200 may cut off the input power depending on the voltage level of the driving power, thereby stopping the switching operation and the operations of each component of the power supply at the time of the standby mode. For example, it is possible to more reduce the standby power than the power supply (including the power supply of the burst mode type) which stops only the switching operation.

Further, in some embodiments, the power supply 100 or 200 may cut off the input power itself when the voltage level $V_O$ of the driving power is equal to or more than the preset voltage level, such that the additional OVP function may be implemented without the OVP circuit. Therefore, it is possible to, for example, but not limited to, the number of parts, the size of the circuit, cost, and the like.

Additionally, in some embodiments, when the control configuration to cut off or supply the input power is formed in the primary side stage, the power supply 100 or 200 may reduce the number of parts, the size of the circuit, cost, and the like.

The functions of various elements illustrated in the drawings of the present invention may be provided by using hardware which may be associated with proper software to execute the software and dedicated hardware. When being by a processor, the function may be provided by a single dedicated processor, a single sharing processor, or a plurality of individual processors which may be partially shared.

Further, the explicit use of the term "control unit" is not to be construed as exclusively designating hardware which may execute software and a microcontroller unit (MCU), digital signal processor (DSP) hardware, a read only memory (ROM) for storing software, a random access memory (RAM), a non-volatile storage device may be implicitly included without being limited.

In claims of the present specification, elements expressed as a unit for performing specific functions includes any method of performing a specific function and these elements may include a combination of circuit elements performing the specific function or any type of software including a firmware, a microcode, and the like which are coupled with circuits suitable to perform software for performing the specific functions.

In the present specification, 'one embodiment' of principles of the present invention and various changes of the expression means that specific features, structures, characteristics, and the like, associated with the embodiment are included in at least one embodiment of the principle of the present invention. Therefore, the expression 'one embodiment' and any other modification examples disclosed throughout the present specification do not necessarily mean the same embodiment.

The designation of various changes of expressions such as "connected" and "connecting", and the like in the present specification means that one element may be connected directly to or coupled directly to another element or be connected to or coupled to another element, having the other element intervening therebetween. Unless explicitly described to the contrary, a singular form includes a plural form in the present specification. In addition, components, steps, operations, and/or elements mentioned in the present specification do not exclude the existence or addition of one or more other components, steps, operations, and/or elements.

Hereinabove, the present invention has been described with reference to exemplary embodiments thereof. All the embodiments and conditional examples disclosed in the present specification are described to help a person having ordinary skilled in the art to which the present invention pertains to understand the principle and concept of the present invention and those skilled in the art may be understood that the present invention may be implemented in a modified form within a range which does not deviating from the essential characteristics of the present invention. Therefore, the exemplary embodiments disclosed herein should be considered in an illustrative aspect rather than a restrictive aspect. The scope of the present invention should be defined by the following claims rather than the above-mentioned description, and all technical spirits equivalent to the following claims should be interpreted as being included in the present invention.

What is claimed is:

1. A power supply, comprising:
    a driving power supply unit converting input power to supply driving power to a load; and
    a power supply control unit performing a control to detect a change in a voltage level of the driving power and cut off the input power when the detected voltage level of the driving power is equal to or more than a first preset voltage level, in a preset standby mode.

2. The power supply according to claim 1, wherein the power supply control unit performs a control to supply the input power when the detected voltage level of the driving power is equal to or less than a second preset voltage level, in the standby mode.

3. The power supply according to claim 2, wherein the power supply control unit includes:
    a driving power detection unit detecting the change in the voltage level of the driving power; and
    an input power control unit performing a control to cut off or supply the input power based on the voltage level of the driving power detected by the driving power detection unit.

4. The power supply according to claim 3, wherein:
    a primary side stage is connected to the input power and a secondary side stage is connected to the driving power, and
    the driving power detection unit and the input power control unit are formed in the primary side stage.

5. The power supply according to claim 4, wherein the driving power detection unit detects the change in the voltage level of the driving power using an auxiliary coil formed in the primary side stage.

6. The power supply according to claim 4, wherein the input power control unit includes:
    a comparator comparing the detected voltage level of the driving power with a preset reference voltage level and outputting a voltage signal having a signal level depending on the comparison result;
    an inverter inverting a level of the voltage signal output from the comparator;
    a timing signal generator connected to the inverter and generating and outputting a timing signal based on the detected voltage level of the driving power; and
    a switching unit turned on/off depending on the timing signal output from the timing signal generator to cut off or supply the input power.

7. The power supply according to claim 6, wherein the timing signal generator outputs a signal of a level which turns off the switching unit when the detected voltage level of the driving power is equal to or more than the preset reference voltage level.

8. The power supply according to claim 6, wherein the timing signal generator outputs a signal of a level which turns on the switching unit when the detected voltage level of the driving power is equal to or less than the preset reference voltage level, in the standby mode.

9. The power supply according to claim 3, wherein:
    a primary side stage is connected to the input power and a secondary side stage is connected to the driving power, and
    the driving power detection unit is formed in the secondary side stage and the input power control unit is formed in the primary side stage.

10. The power supply according to claim 9, wherein the driving power detection unit detects the change in the voltage level of the driving power using a division resistor formed in the secondary side stage.

11. The power supply according to claim 9, wherein the input power control unit includes:
    a comparator comparing the detected voltage level of the driving power with a preset reference voltage level and outputting a voltage signal having a signal level depending on the comparison result;
    an inverter inverting a level of the voltage signal output from the comparator;
    a timing signal generator connected to the inverter and generating and outputting a timing signal based on the detected voltage level of the driving power; and
    a switching unit turned on/off depending on the timing signal output from the timing signal generator to cut off or supply the input power.

12. The power supply according to claim 11, wherein the timing signal generator turns off the switching unit when the detected voltage level of the driving power is equal to or more than the preset reference voltage level.

13. The power supply according to claim 11, wherein the timing signal generator outputs a signal of a level which turns on the switching unit when the detected voltage level of the driving power is equal to or less than the preset reference voltage level, in the standby mode.

14. The power supply according to claim 1, wherein the driving power supply unit includes:
    a filter unit filtering electro-magnetic interference of the input power;
    a rectifying unit rectifying the filtered input power;
    a power switching unit switching the rectified input power;
    a transforming unit transforming the switched input power depending on a preset turn ratio;
    a driving power output unit rectifying the transformed power to output the driving power to the load; and
    a switching controller controlling a switching operation of the power switching unit depending on a feedback signal corresponding to an output of the driving power.

15. The power supply according to claim 14, wherein the power supply control unit is connected to the rectifying unit and performs a control to cut off the rectified input power when the detected voltage level of the driving power is equal to or more than the first preset voltage level.

16. The power supply according to claim 15, wherein the power supply control unit performs a control to supply the rectified input power when the detected voltage level of the driving power is equal to or less than a second preset voltage level, in the standby mode.

17. The power supply according to claim 1, wherein the load comprises at least one light emitting diode.

* * * * *